United States Patent
Yokoyama

(10) Patent No.: US 11,709,361 B2
(45) Date of Patent: Jul. 25, 2023

(54) OPTICAL DEVICE AND IMAGE DISPLAY APPARATUS

(71) Applicant: SEIKO EPSON CORPORATION, Tokyo (JP)

(72) Inventor: Osamu Yokoyama, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 350 days.

(21) Appl. No.: 16/942,489

(22) Filed: Jul. 29, 2020

(65) Prior Publication Data

US 2021/0033870 A1 Feb. 4, 2021

(30) Foreign Application Priority Data

Jul. 30, 2019 (JP) .................. 2019-139497

(51) Int. Cl.
*G02B 27/01* (2006.01)
*G02B 5/18* (2006.01)
*F21V 8/00* (2006.01)

(52) U.S. Cl.
CPC ....... *G02B 27/0172* (2013.01); *G02B 5/1866* (2013.01); *G02B 6/005* (2013.01);
(Continued)

(58) Field of Classification Search
CPC ............. G02B 27/0172; G02B 5/1866; G02B 6/0025; G02B 6/005; G02B 6/0076; G02B 2027/0118; G02B 2027/0178
(Continued)

(56) References Cited

U.S. PATENT DOCUMENTS

2005/0141066 A1* 6/2005 Ouchi ................ G02B 27/1086
348/E5.145
2011/0181960 A1* 7/2011 Tanijiri ............... G02B 27/0172
359/630
(Continued)

FOREIGN PATENT DOCUMENTS

CN 104423042 A 3/2015
CN 104025121 B * 3/2017 ......... G02B 27/0081
(Continued)

OTHER PUBLICATIONS

Hui-Hsiung Lin, Chi-hung Lee, and Mao-Hong Lu. Dye-less color filter fabricated by roll-to-roll imprinting for liquid crystal display applications. Jul. 20, 2009 / vol. 17, No. 15 / Optics Express 12397 (Year: 2009).*

*Primary Examiner* — Collin X Beatty
(74) *Attorney, Agent, or Firm* — Oliff PLC

(57) ABSTRACT

An optical device of the present disclosure includes a first light guide body including a first light-incident portion provided with a first incidence-side diffraction element, and a second light guide body including a second light-incident portion provided with a second incidence-side diffraction element, wherein the second light guide body, when light is caused to enter the first light-incident portion, is disposed at a position at which a part of the light passing through the first light guide body enters the second light-incident portion, and the second incidence-side diffraction element is an element that diffracts light of monochromatic color at a smaller angle than the first incidence-side diffraction element does, when the light of monochromatic color is caused to enter at a same angle.

7 Claims, 8 Drawing Sheets

(52) U.S. Cl.
CPC ......... *G02B 6/0026* (2013.01); *G02B 6/0076* (2013.01); *G02B 2027/0118* (2013.01); *G02B 2027/0178* (2013.01)

(58) Field of Classification Search
USPC ......................................................... 359/566
See application file for complete search history.

(56) References Cited

U.S. PATENT DOCUMENTS

| | | | |
|---|---|---|---|
| 2012/0281721 A1* | 11/2012 | DeJong | H04N 9/3182 372/9 |
| 2014/0340749 A1 | 11/2014 | Yamada et al. | |
| 2015/0062715 A1 | 3/2015 | Yamada et al. | |
| 2018/0095283 A1 | 4/2018 | Takeda et al. | |
| 2019/0041650 A1 | 2/2019 | Yamada et al. | |
| 2020/0116997 A1* | 4/2020 | Lee | G02B 6/0076 |
| 2021/0116622 A1* | 4/2021 | Olkkonen | G02B 6/005 |

FOREIGN PATENT DOCUMENTS

| | | | | |
|---|---|---|---|---|
| CN | 109188689 A | | 1/2019 | |
| JP | 2008-058776 A | | 3/2008 | |
| JP | 2010191303 A | * | 9/2010 | ........... G02B 26/101 |
| JP | 5581910 B2 | * | 9/2014 | |
| JP | 2015-049376 A | | 3/2015 | |
| JP | 2018-054978 A | | 4/2018 | |
| TW | 201730628 A | * | 9/2017 | ............. G02B 26/10 |
| WO | WO-2010035607 A1 | * | 4/2010 | ........ G02B 27/0172 |
| WO | WO-2013057799 A1 | * | 4/2013 | ........ G02B 27/0172 |

\* cited by examiner

OPTICAL DEVICE AND IMAGE DISPLAY APPARATUS

The present application is based on, and claims priority from JP Application Serial Number 2019-139497, filed Jul. 30, 2019, the disclosure of which is hereby incorporated by reference herein in its entirety.

BACKGROUND

1. Technical Field

The present disclosure relates to an optical device and an image display apparatus.

2. Related Art

In recent years, an image display apparatus of a wearable-type such as a head-mounted display has attracted attention. As such an image display apparatus, there is a technology in which a pair of light-guiding plates including a diffractive optical device at a light-incident portion and a light-emitting portion are provided, where image light having different wavelength bands is caused to enter the pair of light-guiding plates (for example, see JP 2015-49376 A, below).

In the above-described image display apparatus, a diffraction efficiency at the diffractive optical device decreases as a diffraction angle increases. In the above-described image display apparatus, for example, when widening a view angle, an incident angle range in which the image light is caused to enter the diffractive optical device is expanded, thus expanding a diffraction angle range at the diffractive optical device as well. This then decreases the diffraction efficiency at one end side of a view angle at which the diffraction angle is large, resulting in an issue of occurrence of brightness unevenness of the image light.

SUMMARY

To resolve the above-described issue, an optical device of a first aspect of the present disclosure is a device including a first light guide body including a first light-incident portion provided with a first incidence-side diffraction element, and a second light guide body including a second light-incident portion provided with a second incidence-side diffraction element, wherein the second light guide body, when light is caused to enter the first light-incident portion, is disposed at a position at which a part of the light passing through the first light guide body enters the second light-incident portion, and the second incidence-side diffraction element is an element that diffracts light of monochromatic color at a smaller angle than the first incidence-side diffraction element does, when the light of monochromatic color is caused to enter at a same angle.

In the optical device of the first aspect, the first incidence-side diffraction element and the second incidence-side diffraction element may be each a diffraction grating of a surface-relief type, and a grating period of the second incidence-side diffraction element may be greater than a grating period of the first incidence-side diffraction element.

In the optical device of the first aspect, the first light guide body may further include a first emission-side diffraction element provided at the first light-emitting portion and having a diffraction angle same as that of the first incidence-side diffraction element, and the second light guide body may further include a second emission-side diffraction element provided at the second light-emitting portion and having a diffraction angle same as that of the second incidence-side diffraction element.

An image display apparatus of a second aspect of the present disclosure includes an image light generation unit configured to generate image light, and a light-guiding optical system on which the image light emitted from the image light generation unit is incident, wherein the light-guiding optical system is constituted by the above-described optical device.

In the image display apparatus of the second aspect, the image light may use laser beam as a light source.

In the image display apparatus of the second aspect, the image light generation unit may be configured to adjust an intensity of the image light based on a diffraction efficiency at the light-guiding optical system, the diffraction efficiency being determined depending on an incident angle at which the image light is incident on the first light guide body and the second light guide body.

The image light generation unit may be configured to relatively reduce an intensity of the image light that is incident on the light-guiding optical system in an angle range in which the diffraction efficiency relatively increases, and to relatively enhance the intensity of the image light being incident on the light-guiding optical system at an angle range at which the diffraction efficiency relatively decreases.

In the image display apparatus of the second aspect, the image light may contain a plurality of color light, a plurality of the light-guiding optical systems may be provided, and the plurality of light-guiding optical systems may include a first light-guiding optical system, a second light-guiding optical system, and a third light-guiding optical system, wherein a first color light of the image light enters the first light-guiding optical system; of the image light, a second color light having a color different from the color of the first color light enters the second light-guiding optical system; and of the image light, a third color light having a color different from colors of the first color light and the second color light enters the third light-guiding optical system.

DESCRIPTION OF EXEMPLARY EMBODIMENTS

Figure 1:
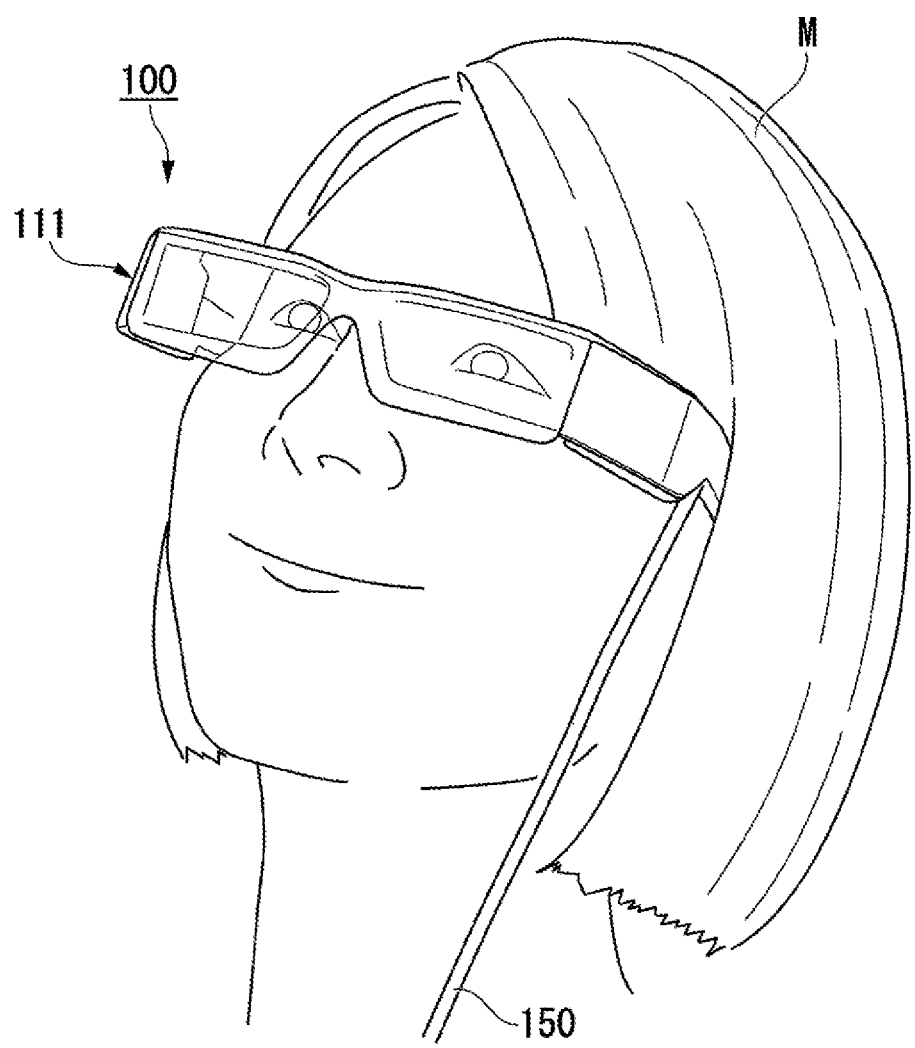
FIG. 1 is a view illustrating a state of an observer wearing an image display apparatus of an embodiment.

Embodiments of the present disclosure will be described in detail below with reference to the accompanying drawings.

Note that, in the drawings used for the following descriptions, characteristic portions are expanded for convenience to make characteristics easily comprehensible in some cases, thus dimension ratios among respective component elements or the like are not necessarily identical to actual dimension ratios.

First Embodiment

An image display apparatus of a first embodiment is a see-through type head-mounted display with which an external world can be viewed along with an image. That is, the image display apparatus makes an observer recognize the image as a virtual image, and makes the observer observe an image of the external world as see-through light.

Figure 2:
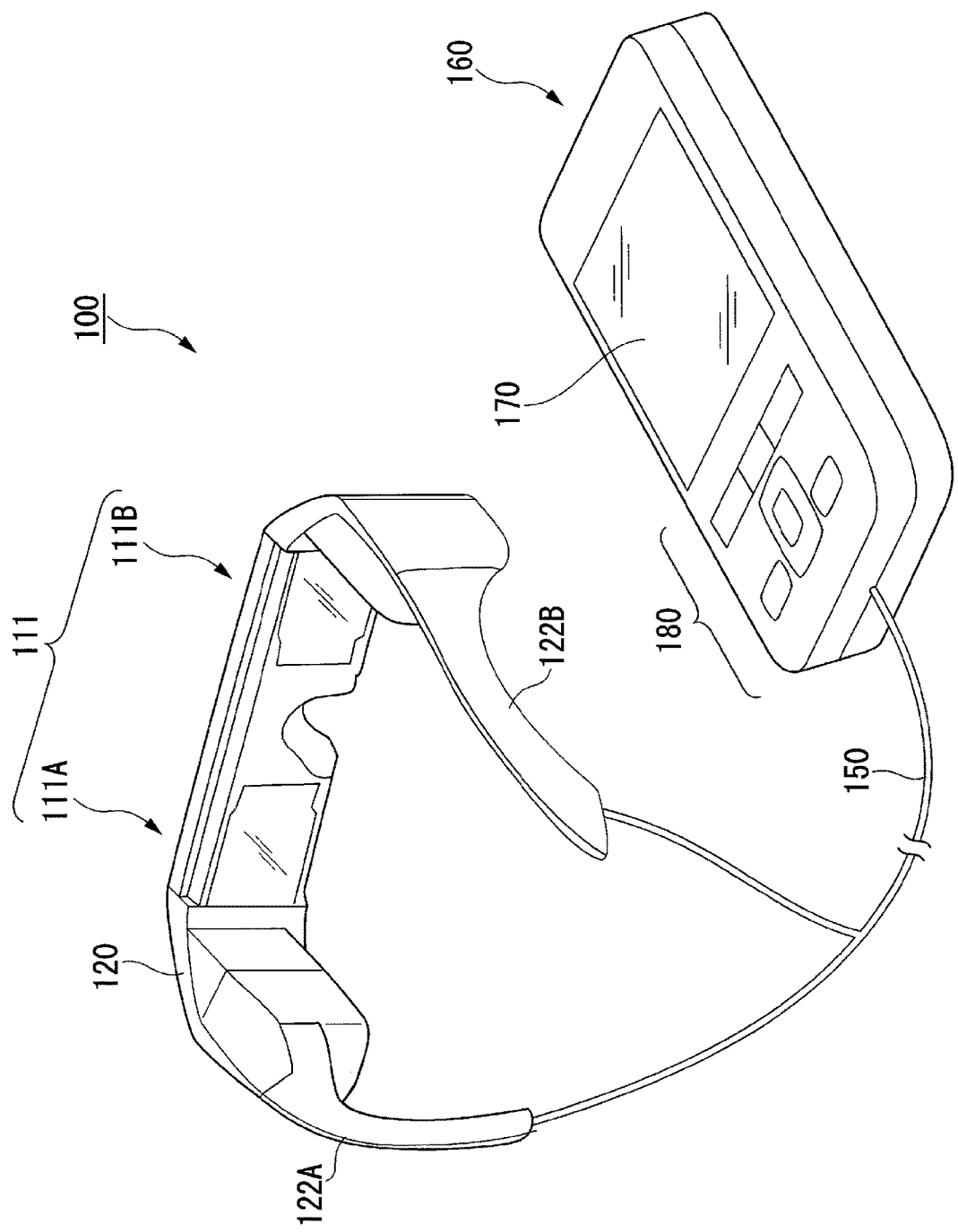
FIG. 2 is a perspective view of the image display apparatus of a first embodiment.

FIG. 1 is a view illustrating a state of an observer wearing the image display apparatus of the first embodiment. FIG. 2 is a perspective view of the image display apparatus of the first embodiment.

As illustrated in FIG. 1, an observer M uses an image display apparatus 100 of the first embodiment, while wearing the apparatus on a head, as in a case of wearing glasses.

As illustrated in FIG. 2, the image display apparatus 100 includes a display unit 111 having a glasses-like shape, and a controller 160 having a small size to a degree that the observer can hold it with a hand. The display unit 111 and the controller 160 are communicatively coupled with each other, by wire, or by wireless. In the first embodiment, each of an image display unit for left eye 111A and an image display unit for right eye 111B configuring the display unit 111, and the controller 160 are communicatively coupled by wire via a cable 150, and communicate an image signal, a control signal, and the like.

The display unit 111 includes a main frame 120, the image display unit for left eye 111A, and the image display unit for right eye 111B. The controller 160 includes a display screen unit 170, and an operation button unit 180.

For example, the display screen unit 170 displays various type of information, commands, and the like that are provided to the observer. The main frame 120 includes a pair of temple portions 122A and 122B adapted to be hung on ears of the observer. The main frame 120 is a member for supporting the image display unit for left eye 111A and the image display unit for right eye 111B.

The image display unit for right eye 111B and the image display unit for left eye 111A have a similar configuration, and respective component elements within both of the display units 111 are symmetrically disposed. Accordingly, in the following, the image display unit for left eye 111A will be described simply as an image display unit 112 (see FIG. 3) in detail, and a description of the image display unit for right eye 111B will be omitted.

Figure 3:
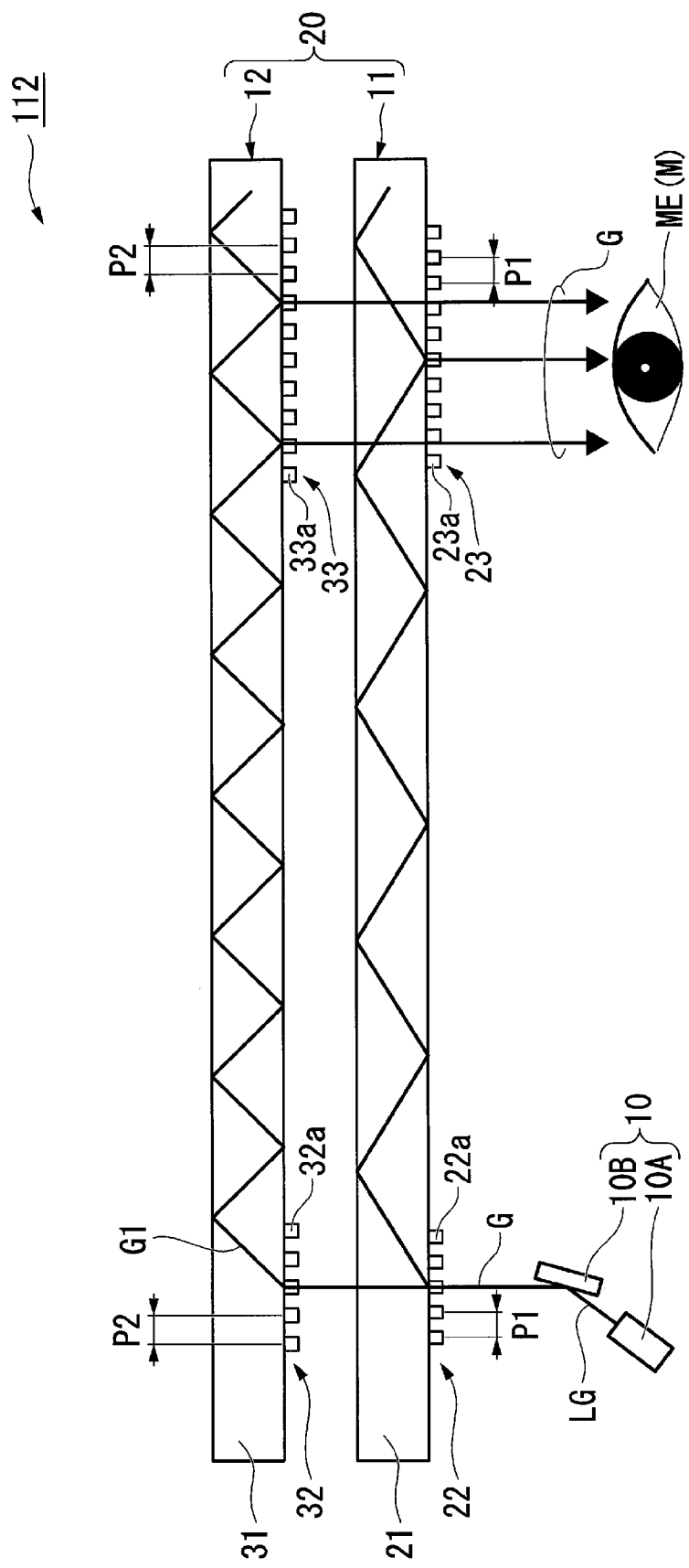
FIG. 3 is a horizontal cross-sectional view illustrating a schematic configuration of an image display unit.

FIG. 3 is a horizontal cross-sectional view illustrating a schematic configuration of an image display unit.

As illustrated in FIG. 3, the image display unit 112 includes an image light generation unit 10 and a light-guiding optical system (optical device) 20. The image light generation unit 10 includes a light source 10A and a MEMS mirror 10B. The light source 10A includes a laser beam source that emits laser beam of monochromatic color. In the first embodiment, the light source 10A emits green laser beam having a peak wavelength of 520 nm, for example. The MEMS mirror 10B is constituted by a micromirror to cause the laser beam to enter the light-guiding optical system 20 via a collective lens (not illustrated) by reflecting the laser beam.

An image signal from a control unit (not illustrated) is input to the image light generation unit 10. The image light generation unit 10 scans the laser beam emitted from the light source 10A with the MEMS mirror 10B and cause the laser beam to enter the light-guiding optical system 20 in time sequence to form image light G.

This allows the image light generation unit 10 to generate the image light G according to the image signal, and emits the image light G toward the light-guiding optical system 20. As such, in the first embodiment, the MEMS mirror 10B scans the laser beam to configure the image light G. Accordingly, the image light G is caused to enter the light-guiding optical system 20 in a state of having a predetermined vibration amplitude (vibration angle).

The light-guiding optical system 20 includes a first light guide body 11 and a second light guide body 12.

The first light guide body 11 includes a first light-guiding plate 21, a first light-incident portion 22, a first light-emitting portion 23, a first incidence-side diffraction element 22a, and a first emission-side diffraction element 23a. In the first embodiment, the first light-guiding plate 21 is a transparent optical glass. Note that a transparent optical plastic can also be used for the first light-guiding plate 21, and a cyclic polyolefin polymer resin, an acrylic resin, a polycarbonate, or the like can be used as well.

The first light-incident portion 22 diffracts the image light G and introduces the image light G into the first light-guiding plate 21. The first light-guiding plate 21 propagates the image light G introduced into the first light-guiding plate 21 by total reflection, as described below. The first light-emitting portion 23 extracts the image light G being propagated by total reflection inside the first light-guiding plate 21 and guides the image light G to an eye ME of the observer M.

The first incidence-side diffraction element 22a is provided at the first light-incident portion 22, and the first emission-side diffraction element 23a is provided at the first light-emitting portion 23. The first incidence-side diffraction element 22a and the first emission-side diffraction element 23a can be appropriately selected from a diffraction grating or a volume hologram of a surface-relief type depending on a required performance. In the first embodiment, the first incidence-side diffraction element 22a and the first emission-side diffraction element 23a are constituted by the diffraction grating of a surface-relief type. A grating period P1 of the first incidence-side diffraction element 22a is identical to the grating period P1 of the first emission-side diffraction element 23a. The image light G emitted from the first light-emitting portion 23 enters the eye ME of the observer M. The image light G is visually recognized by the observer M as a virtual image.

The second light guide body 12 includes a second light-guiding plate 31, a second light-incident portion 32, a second light-emitting portion 33, a second incidence-side diffraction element 32a, and a second emission-side diffraction element 33a. In the first embodiment, the second light-guiding plate 31 is a transparent optical glass. Note that a transparent optical plastic can also be used as the second light-guiding plate 31, and a cyclic polyolefin polymer resin, acrylic resin, polycarbonate, or the like can be used as well.

A part of the image light G passing through the first light guide body 11 enters the second light guide body 12. The second light-incident portion 32 diffracts the part of the image light G being incident and introduces the part of the image light G into the second light-guiding plate 31. The second light-guiding plate 31 propagates the part of the image light G introduced into the second light-guiding plate 31 by total reflection, as described below. The second light-emitting portion 33 extracts the part of the image light G being propagated by total reflection inside the second light-guiding plate 31 and guides the part of the image light G to the eye ME of the observer M.

The second incidence-side diffraction element 32a is provided at the second light-incident portion 32, and the second emission-side diffraction element 33a is provided at the second light-emitting portion 33. In the first embodiment, the second incidence-side diffraction element 32a and the second emission-side diffraction element 33a are constituted by the diffraction grating of a surface-relief type. A grating period P2 of the second incidence-side diffraction element 32a is identical to the grating period P2 of the second emission-side diffraction element 33a. The part of the image light G emitted from the second light-emitting portion 33 passes through the first light guide body 11 to enter the eye ME of the observer M. The part of the image light G is visually recognized by the observer M as a virtual image.

Figure 4:
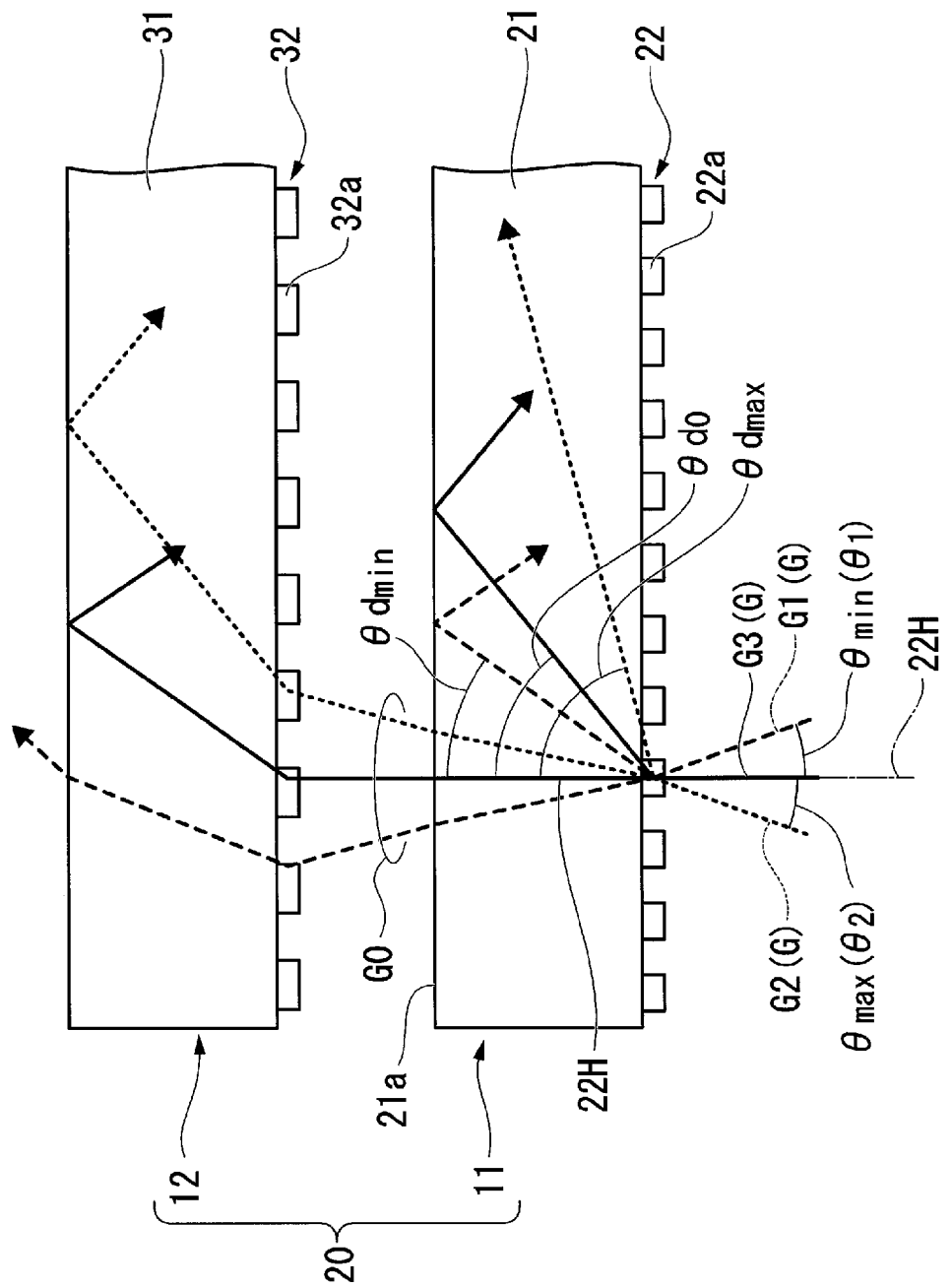
FIG. 4 is a cross-sectional view illustrating a configuration of a main portion on a light incidence-side of a light-guiding optical system.

FIG. 4 is a cross-sectional view illustrating a configuration of a main portion on a light incidence-side of the light-guiding optical system. As illustrated in FIG. 4, the image light G is incident on the first incidence-side diffraction element 22a of the first light guide body 11 in an angle range from an incident angle $\theta_1$ to an incident angle $\theta_2$.

Here, in the image light G being incident on the first incidence-side diffraction element 22a, the incident angle $\theta_1$ is the greatest in absolute value among incident angles, with respect to a normal line 22H of the first incidence-side diffraction element 22a, at which light rays being incident in a direction approximating the first emission-side diffraction element 23a. In the image light G being incident on the first incidence-side diffraction element 22a, the incident angle $\theta_2$ is the greatest in absolute value among the incident angles, with respect to the normal line 22H of the first incidence-side diffraction element 22a, at which light rays being incident in a direction away from the first emission-side diffraction element 23a.

The incident angle $\theta_1$ and the incident angle $\theta_2$ are positive in the clockwise direction with respect to the normal line 22H of the first incidence-side diffraction element 22a. Accordingly, the incident angle $\theta_1$ and the incident angle $\theta_2$ have an identical absolute value, where the incident angle $\theta_1$, which is formed in the counterclockwise direction with respect to the normal line 22H, is a negative value, and the incident angle $\theta_2$, which is the clockwise direction with respect to the normal line 22H, is a positive value.

Hereinafter, for convenience, the incident angle $\theta_1$ is referred to as "minimum incident angle $\theta_{min}$", and the incident angle $\theta_2$ is referred to as "maximum incident angle $\theta_{max}$".

The image light G1 being incident on the first incidence-side diffraction element 22a at the minimum incident angle $\theta_{min}$ is diffracted by the first incidence-side diffraction element 22a to be propagated inside the first light-guiding plate 21 at a first propagation angle $\theta d_{min}$. Here, the term "propagation angle of image light" is defined by the incident angle at which the image light is incident on a surface of the light-guiding plate. In the first embodiment, the first propagation angle $\theta d_{min}$ is set greater than a critical angle of the first light-guiding plate 21, and the image light G1 is propagated while being totally reflected inside the first light-guiding plate 21.

In addition, image light G2 being incident on the first incidence-side diffraction element 22a at the maximum incident angle $\theta_{max}$ is diffracted by the first incidence-side diffraction element 22a to be propagated inside the first light-guiding plate 21 at a second propagation angle $\theta d_{max}$. In the first embodiment, the second propagation angle $\theta d_{max}$ is set greater than the critical angle of the first light-guiding plate 21, and thus the image light G1 is propagated while being totally reflected inside the first light-guiding plate 21. The second propagation angle $\theta d_{max}$ is greater than the first propagation angle $\theta d_{min}$. This allows the image light G2 to be incident on the surface of the first light-guiding plate 21, in an almost horizontally inclined state, that is, at a large incident angle with respect to the surface of the first light-guiding plate 21. On the other hand, the image light G1 is incident on the surface of the first light-guiding plate 21, in a vertically standing state, that is, at a small incident angle with respect to the surface of the first light-guiding plate 21.

Note that the image light G3 being incident on the first incidence-side diffraction element 22a at an incident angle of 0 degree, which is between the minimum incident angle $\theta_{min}$ and the maximum incident angle $\theta_{max}$, is diffracted by the first incidence-side diffraction element 22a to be propagated inside the first light-guiding plate 21 at a third propagation angle $\theta d_0$. In the first embodiment, the third propagation angle $\theta d_0$ is set greater than the critical angle of the first light-guiding plate 21, and the image light G3 is propagated while being totally reflected inside the first light-guiding plate 21. Note that the image light G3 is incident on the surface of the first light-guiding plate 21 at an incident angle between the image light G1 and the image light G2.

Figure 5:
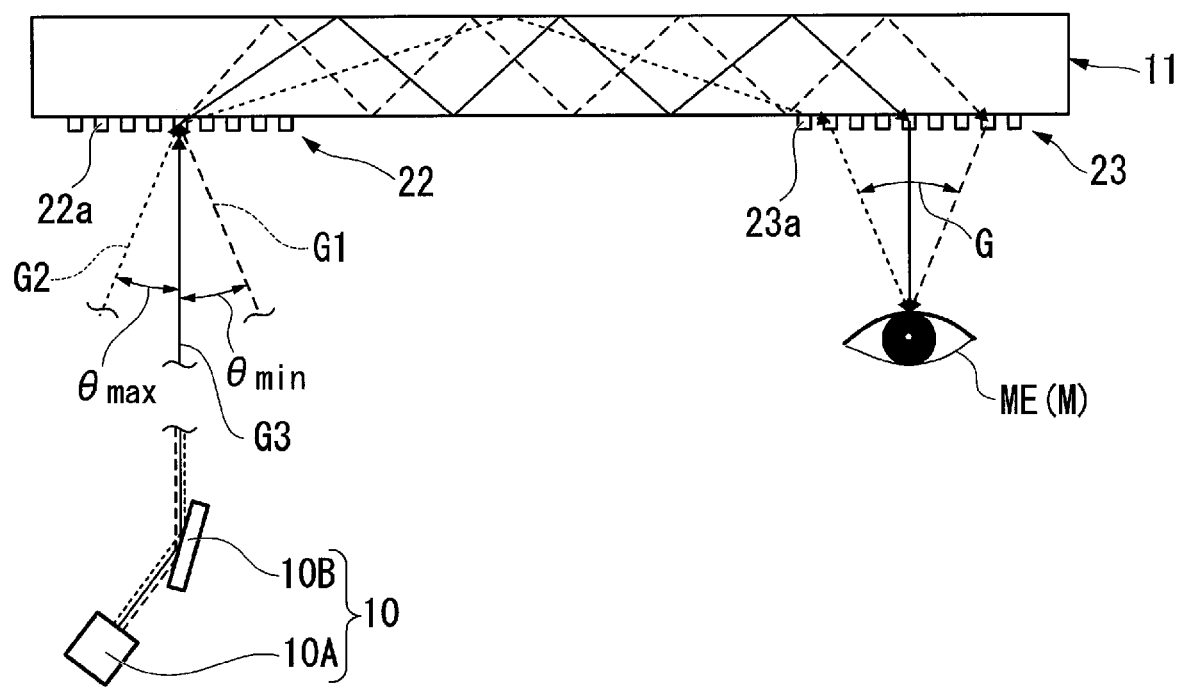
FIG. 5 is an explanatory view illustrating a propagation of light at a first light guide body.

FIG. 5 is an explanatory view illustrating a propagation of light at the first light guide body.

As illustrated in FIG. 5, the image light G1 to G3 emitted from the image light generation unit 10 is propagated while being totally reflected inside the first light-guiding plate 21, and is diffracted by the first emission-side diffraction element 23a to be extracted to the outside. Then, the image light G1 to G3 enters the eye ME of the observer M.

In the first embodiment, the grating period P1 of the first incidence-side diffraction element 22a is identical to the grating period P1 of the first emission-side diffraction element 23a. Accordingly, emission angles at which the image light G1 to G3 is emitted from the first emission-side diffraction element 23a are identical to the incident angles at which the image light G1 to G3 is incident on the first incidence-side diffraction element 22a, respectively. Thus, $\theta_{max} - \theta_{min}$ coincides with a view angle of the image light G that determines the size of the virtual image.

As illustrated in FIG. 4, in the light-guiding optical system 20 of the first embodiment, the part of the image light G passes through the first light-guiding plate 21 to enter the second light guide body 12. Specifically, zeroth-order diffraction light G0 that is not diffracted by the first incidence-side diffraction element 22a is refracted at an upper surface 21a of the first light-guiding plate 21 to be emitted. Thus, the zeroth-order diffraction light G0 emitted from the upper surface 21a advances in a direction identical to the direction when the light enters the first light guide body 11. That is, an incident angle at which the zeroth-order diffraction light G0 is incident on the second incidence-side diffraction element 32a of the second light guide body 12 is identical to an incident angle at which the image light G is incident on the first incidence-side diffraction element 22a.

Figure 6:
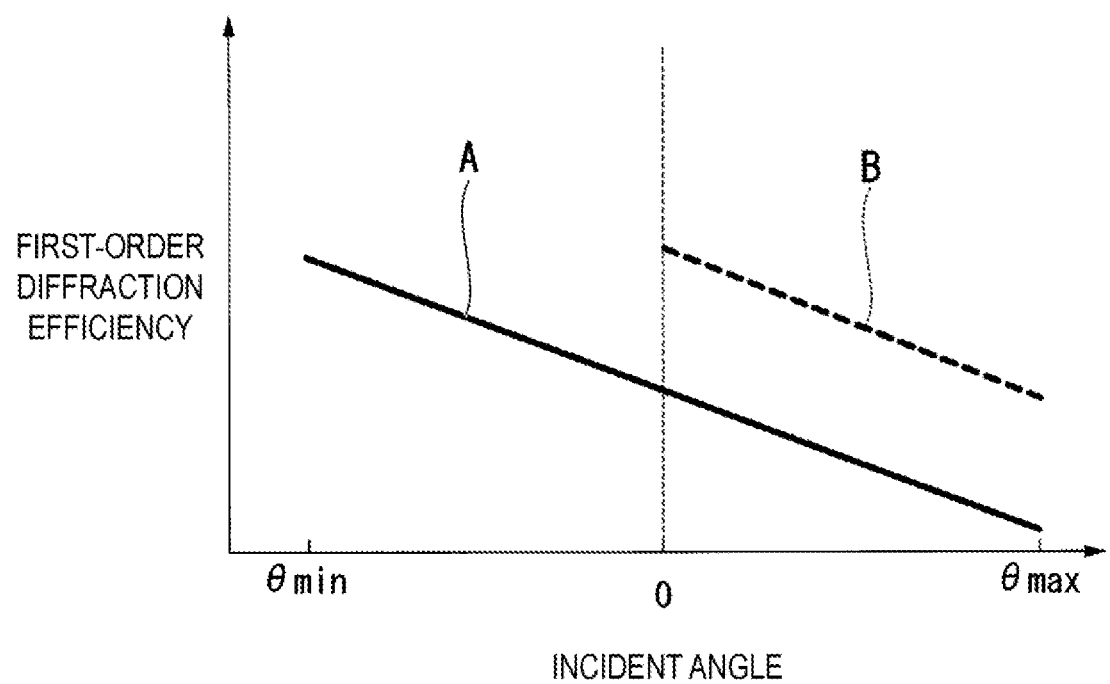
FIG. 6 is a graph qualitatively illustrating an incident angle dependency of first and second incidence-side diffraction elements.

FIG. 6 is a graph illustrating the relationship between the incident angle and the diffraction efficiency at the first incidence-side diffraction element and the second incidence-side diffraction element. Specifically, FIG. 6 is a graph qualitatively illustrating an incident angle dependency of the diffraction efficiency at the first incidence-side diffraction element 22a and the second incidence-side diffraction element 32a, where the incident angle dependency of the first incidence-side diffraction element 22a is denoted by reference sign A, and the incident angle dependency of the second incidence-side diffraction element 32a is denoted by reference sign B.

In FIG. 6, the horizontal axis indicates the incident angle at which the image light G is incident on the first incidence-side diffraction element 22a and the second incidence-side diffraction element 32a, and the vertical axis indicates a first-order diffraction efficiency at the first incidence-side diffraction element 22a and the second incidence-side diffraction element 32a. Note that the first-order diffraction efficiency corresponds to a ratio of first diffraction light diffracted by the first incidence-side diffraction element 22a and the second incidence-side diffraction element 32a to be introduced into the light-guiding plate.

As illustrated in FIG. 6, as the incident angle at which the image light G is incident on the first incidence-side diffraction element 22a approximates $\theta_{max}$, the first-order diffraction efficiency decreases. Considering the above in terms of a virtual image that is visually recognized by the observer M, light having the minimum incident angle $\theta_{min}$ that defines one end side of the view angle is visually recognized as a bright virtual image, while light having the maximum incident angle $\theta_{max}$ that defines the other end side of the view angle is visually recognized as a dark virtual image. That is, when guiding the image light G to the eye ME of the observer M using only the first light guide body 11, a brightness unevenness occurs in the virtual image.

In the light-guiding optical system 20 of the first embodiment, the second light guide body 12 is combined with the first light guide body 11, to thus reduce the occurrence of brightness unevenness of the virtual image, as described below.

In the first embodiment, the grating period P2 of the second incidence-side diffraction element 32a is greater than the grating period P1 of the first incidence-side diffraction element 22a. That is, a diffraction angle of the second incidence-side diffraction element 32a is less than the diffraction angle of the first incidence-side diffraction element 22a.

The grating period P2 of the second incidence-side diffraction element 32a is set such that a diffraction angle of light being incident at the incident angle of 0 degree coincides with a critical angle of the second light-guiding plate 31.

Thus, the zeroth-order diffraction light G0 being incident on the second incidence-side diffraction element 32a of the second light guide body 12 from the minimum incident angle $\theta_{min}$ to less than 0 degree is diffracted at an angle smaller than the critical angle of the second light-guiding plate 31. Accordingly, the zeroth-order diffraction light $G_0$ being incident on the second incidence-side diffraction element 32a from the minimum incident angle $\theta_{min}$ to less than 0 degree passes through the second light-guiding plate 31 without being propagated by total reflection inside the second light-guiding plate 31 (see FIG. 5).

In the second incidence-side diffraction element 32a of the first embodiment, as illustrated in FIG. 6, the first-order diffraction efficiency becomes the maximum at the incident angle of 0 degree and gradually decreases as approximating the maximum incident angle $\theta_{max}$ in light that can be propagated by total reflection inside the second light guide body 12 in the zeroth-order diffraction light $G_0$. Thus, the incident angle at which the first-order diffraction efficiency becomes the maximum at the second incidence-side diffraction element 32a is greater than the incident angle at which the first diffraction efficiency becomes the maximum at the first incidence-side diffraction element 22a.

According to the light-guiding optical system 20 of the first embodiment, light having the minimum incident angle $\theta_{min}$ with high first-order diffraction efficiency at the first incidence-side diffraction element 22a is diffracted at an angle smaller than the critical angle of the second light-guiding plate 31 by the second incidence-side diffraction element 32a, and the light is not guided inside the second light-guiding plate 31.

In the light-guiding optical system 20 of the first embodiment, the zeroth-order diffraction light $G_0$ being incident on the second incidence-side diffraction element 32a at the incident angle of 0 degree is diffracted at an angle enabling to propagate the light at the critical angle inside the second light-guiding plate 31. That is, the zeroth-order diffraction light $G_0$ being incident on the second incidence-side diffraction element 32a at an incident angle of not less than 0 degree and not greater than $\theta_{max}$ is propagated by total reflection inside the second light-guiding plate 31.

Thus, the light-guiding optical system 20 of the first embodiment can cause the image light G in an angle range in which the first-order diffraction efficiency is low (an incident angle from 0 degree to $\theta_{max}$) at the first incidence-side diffraction element 22a to be diffracted at a diffraction efficiency that is higher than the diffraction efficiency at the first incidence-side diffraction element 22a at the second incidence-side diffraction element 32a and to enter into the second light-guiding plate 31.

The light being propagated by total reflection inside the second light-guiding plate 31 is diffracted by the second emission-side diffraction element 33a to be extracted to the outside (see FIG. 3). In the first embodiment, the grating periods P2 of the second incidence-side diffraction element 32a and the second emission-side diffraction element 33a are identical to each other, and thus, an emission angle at which the light is emitted from the second emission-side diffraction element 33a is equal to the incident angle at which the zeroth-order diffraction light $G_0$ is incident on the second incidence-side diffraction element 32a, as illustrated in FIG. 3. Thus, the light emitted from the second emission-side diffraction element 33a passes through the first light guide body 11 to enter the eye ME of the observer M at a predetermined angle (see FIG. 3).

Here, in order to cause a virtual image without brightness unevenness to be visually recognized by the eye ME of the observer M, it is worthy of consideration to minimize the difference in diffraction efficiencies at the light-guiding optical system 20 within the view angle range for visually recognizing the virtual image.

Figure 7:
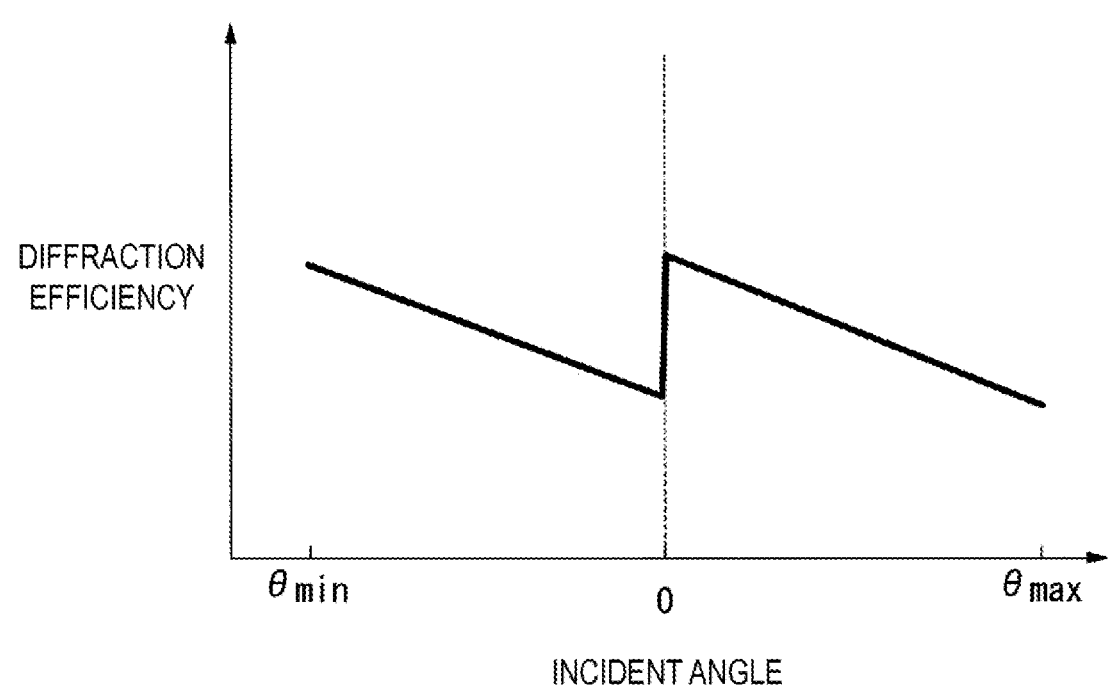
FIG. 7 is a graph illustrating a diffraction efficiency at a light-guiding optical system.

FIG. 7 is a graph illustrating the diffraction efficiency at the light-guiding optical system 20. In FIG. 7, the horizontal axis indicates the incident angle at which the image light is incident on the light-guiding optical system 20, and the vertical axis indicates the diffraction efficiency. The diffraction efficiency at the light-guiding optical system 20 represents a ratio at which the image light is actually propagated inside the first light-guiding plate 21 and the second light-guiding plate 31. Specifically, the diffraction efficiency at the light-guiding optical system 20 is defined by the sum of the first-order diffraction efficiency at the first incidence-side diffraction element 22a, and an efficiency obtained by zeroth-order diffraction efficiency at the first incidence-side diffraction element 22a multiplied by the first-order diffraction efficiency at the second incidence-side diffraction element 32a.

Here, as a comparative example, a consideration is given to the diffraction efficiency at a light-guiding optical system in which only the first light guide body 11 is used. In the light-guiding optical system of the comparative example, as the incident angle increases from $\theta_{min}$ to $\theta_{max}$, the diffraction efficiency decreases, and thus, the brightness unevenness occurs in the virtual image (see FIG. 4), as described above.

In contrast, according to the light-guiding optical system 20 of the first embodiment, although the diffraction efficiency decreases in an angle range from the minimum incident angle $\theta_{min}$ to the incident angle of 0 degree as illustrated in FIG. 7, the diffraction efficiency shifts upward in an angle range from the incident angle of 0 degree to the maximum incident angle $\theta_{max}$.

According to the light-guiding optical system 20 of the first embodiment, the diffraction efficiency is caused to shift upward in an angle range from the incident angle of 0 degree to the maximum incident angle $\theta_{max}$ without the diffraction efficiency continuously decreasing in an angle range from the minimum incident angle $\theta_{min}$ to the maximum incident angle $\theta_{max}$ as in the comparative example, thus making it possible to minimize the difference in the diffraction efficiency within the view angle range for visually recognizing the virtual image.

This allows the light-guiding optical system 20 of the first embodiment to enhance the brightness of the virtual image due to an angle range from the incident angle of 0 degree to the maximum incident angle $\theta_{max}$ with respect to the brightness of the virtual image due to the angle range from the minimum incident angle $\theta_{min}$ to the incident angle of 0 degree, to thus achieve a virtual image with reduced brightness unevenness in a wide view angle range.

Further, in the first embodiment, because the image light G is constituted by laser beam that is light having a single wavelength, no significant difference in diffraction efficiencies occur due to a broad wavelength range of the image light at the first incidence-side diffraction element 22a and the second incidence-side diffraction element 32a, thus making it possible to further improve a brightness evenness of the virtual image.

In addition, in the image display unit 112 of the first embodiment, the image light generation unit 10 adjusts an intensity of the image light G based on the diffraction efficiency at the light-guiding optical system 20.

Figure 8:
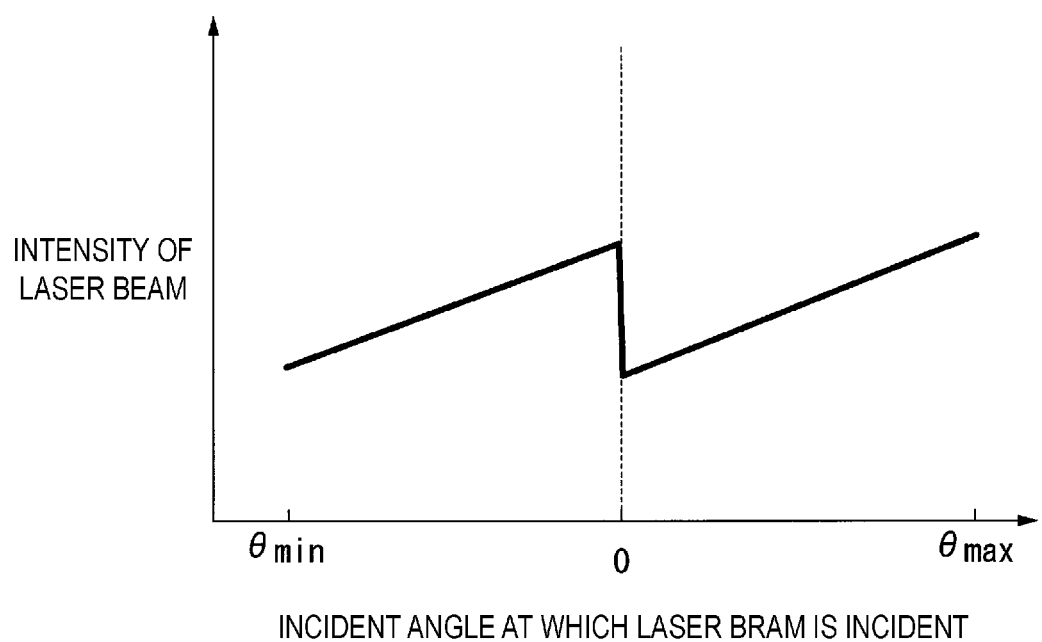
FIG. 8 is a graph illustrating a relationship between an incident angle and an intensity of image light at an image light generation unit.

FIG. 8 is a graph illustrating the relationship between the incident angle and the intensity of the image light G at the image light generation unit 10. In FIG. 8, the horizontal axis indicates the incident angle at which the laser beam is incident on the light-guiding optical system 20, and the vertical axis indicates an intensity of the laser beam that is output from the light source 10A of the image light generation unit 10.

As illustrated in FIG. 8, the image light generation unit 10 controls the light source 10A to relatively reduce the intensity of the laser beam being incident, as the image light G, on the light-guiding optical system 20 in an angle range (an incident angle from 0 degree to not greater than $\theta_{max}$) in which the diffraction efficiency at the light-guiding optical system 20 illustrated in FIG. 7 is relatively high, and to relatively enhance the intensity of the laser beam being incident, as the image light G, on the light-guiding optical system 20 in an angle range (from the minimum incident angle $\theta_{min}$ to less than 0 degree) in which a synthesized diffraction efficiency is relatively low.

According to the image display unit 112 of the first embodiment, the brightness of the virtual image being incident on the light-guiding optical system 20 in the angle range from the minimum incident angle $\theta_{min}$ to the maximum incident angle $\theta_{max}$ to be guided to the eye ME of the observer M can be substantially equivalent. This allows the image display unit 112 of the first embodiment to cause the eye ME of the observer M to visually recognize the virtual image with reduced brightness unevenness in a wide view angle range.

Second Embodiment

Next, a second embodiment of the present disclosure will be described.

The basic configuration of an image display apparatus of the second embodiment is identical to that of the first embodiment, and the configuration of the image display unit of the second embodiment is different from that of the first embodiment. Accordingly, a description about an image display unit will be given while omitting the description of the overall configuration of the image display apparatus.

Figure 9:
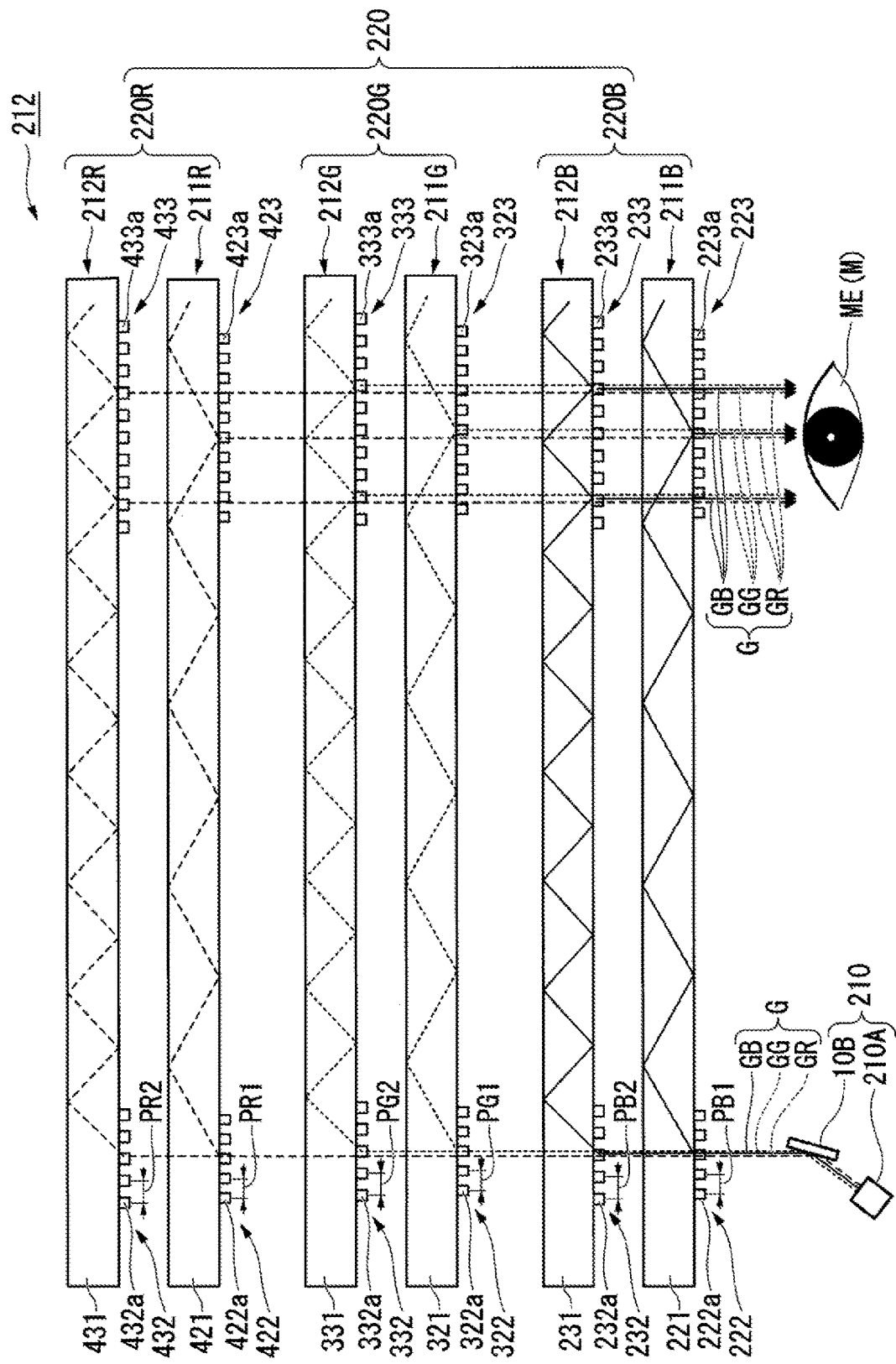
FIG. 9 is a horizontal cross-sectional view illustrating a schematic configuration of an image display unit of a second embodiment.

FIG. 9 is a horizontal cross-sectional view illustrating a schematic configuration of the image display unit of the second embodiment. Note that in FIG. 9, components common to those of the drawings used in the first embodiment are denoted with the same reference signs, and the detailed description will be omitted.

As illustrated in FIG. 9, an image display unit 212 of the second embodiment includes an image light generation unit 210 and a plurality of light-guiding optical systems (optical devices) 220. The image light generation unit 210 includes a light source 210A and the MEMS mirror 10B. The light source 210A includes a laser beam source that emits red laser beam, green laser beam, and blue laser beam. The red laser beam is, for example, light having a peak wavelength of 638 nm, the green laser beam is, for example, light having a peak wavelength of 520 nm, and the blue laser beam is, for example, light having a peak wavelength of 450 nm.

The image light generation unit 210 scans the laser beam of respective colors emitted from the light source 210A by the MEMS mirror 10B, and causes the laser beam to enter the light-guiding optical system 20 in time sequence, to form the image light G. The image light generation unit 210 of the second embodiment scans the laser beam in time sequence to generate the image light G. The image light G contains a plurality of color light. Specifically, the image light G includes blue image light (first color light) GB composed of blue laser beam, green image light (second color light) GG composed of green laser beam, and red image light (third color light) GR composed of red laser beam.

The plurality of light-guiding optical systems 220 include a first light-guiding optical system 220B, a second light-guiding optical system 220G, and a third light-guiding optical system 220R. In the second embodiment, the first light-guiding optical system 220B, the second light-guiding optical system 220G, and the third light-guiding optical system 220R are provided in this order at positions near the image light generation unit 210.

The first light-guiding optical system 220B mainly propagates the blue image light GB. The second light-guiding optical system 220G mainly propagates the green image light GG. The green image light GG passes through the first light-guiding optical system 220B to enter a second light-guiding optical system 220G. The third light-guiding optical system 220R mainly propagates the red image light GR. The red image light GR passes through the first light-guiding optical system 220B and the second light-guiding optical system 220G to enter the third light-guiding optical system 220R.

The first light-guiding optical system 220B, the second light-guiding optical system 220G, and the third light-guiding optical system 220R have an identical basic configuration, and are different in including a diffraction element having a grating period according to the wavelength of light being incident.

The first light-guiding optical system 220B includes a first light guide body 211B and a second light guide body 212B. The first light guide body 211B includes a first light-guiding plate 221, a first light-incident portion 222, a first light-emitting portion 223, a first incidence-side diffraction element 222a, and a first emission-side diffraction element 223a. A grating period PB1 of the first incidence-side diffraction element 222a is identical to the grating period PB1 of the first emission-side diffraction element 223a.

The second light guide body 212B includes a second light-guiding plate 231, a second light-incident portion 232, a second light-emitting portion 233, a second incidence-side diffraction element 232a, and a second emission-side diffraction element 233a. The grating period PB2 of the second incidence-side diffraction element 232a is identical to the grating period PB2 of the second emission-side diffraction element 233a.

In the second embodiment, the grating period PB2 of the second incidence-side diffraction element 232a is greater than the grating period PB1 of the first incidence-side diffraction element 222a. This allows the first light-guiding optical system 220B to acquire a virtual image due to the blue image light GB with reduced brightness unevenness in a wide view angle range.

The second light-guiding optical system 220G includes a first light guide body 211G and a second light guide body 212G. The first light guide body 211G includes a first light-guiding plate 321, a first light-incident portion 322, a first light-emitting portion 323, a first incidence-side diffraction element 322a, and a first emission-side diffraction element 323a. A grating period PG1 of the first incidence-side diffraction element 322a is identical to the grating period PG1 of the first emission-side diffraction element 323a.

The second light guide body 212G includes a second light-guiding plate 331, a second light-incident portion 332, a second light-emitting portion 333, a second incidence-side diffraction element 332a, and a second emission-side diffraction element 333a. A grating period PG2 of the second incidence-side diffraction element 332a is identical to the grating period PG2 of the second emission-side diffraction element 333a.

In the second embodiment, the grating period PG2 of the second incidence-side diffraction element 332a is greater than the grating period PG1 of the first incidence-side diffraction element 322a. This allows the second light-guiding optical system 220G to acquire a virtual image due to the green image light GG with reduced brightness unevenness in a wide view angle range.

The third light-guiding optical system 220R includes a first light guide body 211R and a second light guide body 212R. The first light guide body 211R includes a first light-guiding plate 421, a first light-incident portion 422, a first light-emitting portion 423, a first incidence-side diffraction element 422a, and a first emission-side diffraction element 423a. A grating period PR1 of the first incidence-side diffraction element 422a is identical to the grating period PR1 of the first emission-side diffraction element 423a.

The second light guide body 212R includes a second light-guiding plate 431, a second light-incident portion 432, a second light-emitting portion 433, a second incidence-side diffraction element 432a, and a second emission-side diffraction element 433a. A grating period PR2 of the second incidence-side diffraction element 432a is identical to the grating period PR2 of the second emission-side diffraction element 433a.

In the second embodiment, the grating period PR2 of the second incidence-side diffraction element 432a is greater than the grating period PR1 of the first incidence-side diffraction element 422a. This allows the third light-guiding optical system 220R to acquire a virtual image due to the red image light GR with reduced brightness unevenness in a wide view angle range.

This allows the image display unit 212 of the second embodiment to cause the eye ME of the observer M to visually recognize a virtual image of even brightness in full color.

The image display unit 212 of the second embodiment may cause the image light generation unit 210 to adjust the respective intensities of the blue image light GB, the green image light GG, and the red image light GR, based on the diffraction efficiencies at the light-guiding optical systems 220B, 220G, and 220R.

Note that the technical scope of the present disclosure is not limited to the above-described embodiments, and various modifications can be made to the above-described embodiments without departing from the spirit and gist of the present disclosure.

For example, in the above-described embodiments, an example is given of a configuration in which the image light is formed by two-dimensional scanning of the laser beam as the image light generation units 10 and 210, however, the image light generation unit may be configured by an image display device such as a liquid crystal display device, an organic EL display device, or the like.

For example, even an image display apparatus that performs green monochrome display also has a broad emission spectrum. In general, a longer wavelength of light being incident on the diffraction element leads to an increase in the diffraction angle. Accordingly, a grating period of the diffraction grating is set such that light having wavelength on the short wavelength side of the emission spectrum is diffracted at the critical angle of the light-guiding plate. Even when using the image display apparatus that performs green monochrome display as such, an issue arises such as that the diffraction efficiency decreases when it becomes to an incident angle that causes the propagation angle inside the light-guiding plate to increase, thus the configuration of the light-guiding optical system of the present disclosure is of effective use.

In addition, in the above-described embodiments, an example is given of a case in which the light-guiding optical system is constituted by two pieces of light guide bodies, however, the virtual image with reduced brightness unevenness may be obtained using a light-guiding optical system constituted by three or more pieces of the light guide bodies.

What is claimed is:

1. An image display apparatus comprising:
an image light generation unit configured to generate an image light; and
a light-guiding optical system on which the image light emitted from the image light generation unit is incident,
wherein the light-guiding optical system comprises:
a first light guide body including a first light-incident portion provided with a first incidence-side diffraction element; and
a second light guide body including a second light-incident portion provided with a second incidence-side diffraction element,
the second light guide body, when a light is caused to enter the first light-incident portion, is disposed at a position at which a part of the light passing through the first light guide body enters the second light-incident portion,
the second incidence-side diffraction element diffracts light of a first monochromatic color at a smaller angle than an angle at which the first incidence-side diffraction element diffracts the light of the first monochromatic color, when the light of the first monochromatic color is caused to enter the first incidence-side diffraction element and the second incidence-side diffraction element at a same angle, and
the image light generation unit is configured to adjust an intensity of the image light based on an incident angle at which the image light is incident on the first light guide body and the second light guide body.

2. The image display apparatus according to claim 1, wherein
the first incidence-side diffraction element and the second incidence-side diffraction element are each a diffraction grating of a surface-relief type, and
a grating period of the second incidence-side diffraction element is greater than a grating period of the first incidence-side diffraction element.

3. The image display apparatus according to claim 1, wherein
the first light guide body further includes a first emission-side diffraction element provided at a first light-emitting portion and having a diffraction angle same as that of the first incidence-side diffraction element, and
the second light guide body further includes a second emission-side diffraction element provided at a second light-emitting portion and having a diffraction angle same as that of the second incidence-side diffraction element.

4. The image display apparatus according to claim 1, wherein the image light uses laser beam as a light source.

5. The image display apparatus according to claim 1, wherein the image light generation unit is configured to relatively reduce an intensity of the image light that is incident on the light-guiding optical system in an angle range in which diffraction efficiency relatively increases, and to relatively enhance the intensity of the image light that is incident on the light-guiding optical system at an angle range at which the diffraction efficiency relatively decreases.

6. The image display apparatus according to claim 1, wherein
the image light contains a plurality of color light,
a plurality of the light-guiding optical systems are provided, and
the plurality of light-guiding optical systems include a first light-guiding optical system, a second light-guiding optical system, and a third light-guiding optical system, and wherein
a first color light of the image light enters the first light-guiding optical system,
of the image light, a second color light having a color different from a color of the first color light enters the second light-guiding optical system, and
of the image light, a third color light having a color different from colors of the first color light and the second color light enters the third light-guiding optical system.

7. An image display apparatus comprising:
an image light generation unit configured to generate an image light; and
a light-guiding optical system on which the image light emitted from the image light generation unit is incident,
wherein the light-guiding optical system comprises:
a first light guide body including a first light-guiding plate having a first critical angle of total internal reflection and a first light-incident portion provided with a first incidence-side diffraction element; and
a second light guide body including a second light-guiding plate having a second critical angle of total internal reflection and a second light-incident portion provided with a second incidence-side diffraction element,
the second light guide body, when a light is caused to enter the first light-incident portion, is disposed at a position at which a part of the light passing through the first light guide body enters the second light-incident portion,
the second incidence-side diffraction element is an element that diffracts light of monochromatic color at a smaller angle than the first incidence-side diffraction element does, when the light of monochromatic color is caused to enter at a same angle,
a portion of the light of the monochromatic color passing through the first light guide body and entering the second light guide body is diffracted at an angle smaller than the second critical angle by the second incidence-side diffraction element, with the portion not being guided inside the second light-guiding plate, and
the image light generation unit is configured to adjust an intensity of the image light based on an incident angle at which the image light is incident on the first light guide body and the second light guide body.

* * * * *